(12) United States Patent
Wang et al.

(10) Patent No.: US 10,018,775 B2
(45) Date of Patent: Jul. 10, 2018

(54) BACKLIGHT MODULE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Juan Wang, Beijing (CN); Guannan Song, Beijing (CN); Zhanchang Bu, Beijing (CN); Woong Kim, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 154 days.

(21) Appl. No.: 14/428,897

(22) PCT Filed: Jul. 25, 2014

(86) PCT No.: PCT/CN2014/083059
§ 371 (c)(1),
(2) Date: Mar. 17, 2015

(87) PCT Pub. No.: WO2015/096473
PCT Pub. Date: Jul. 2, 2015

(65) Prior Publication Data
US 2016/0011357 A1    Jan. 14, 2016

(30) Foreign Application Priority Data
Dec. 27, 2013  (CN) .......................... 2013 1 0741292

(51) Int. Cl.
*F21V 7/04*    (2006.01)
*F21V 8/00*    (2006.01)

(52) U.S. Cl.
CPC ............. *G02B 6/009* (2013.01); *G02B 6/005* (2013.01); *G02B 6/0068* (2013.01); *G02B 6/0073* (2013.01); *G02B 6/0085* (2013.01)

(58) Field of Classification Search
CPC ... G02B 6/009; F21V 19/003; F21V 19/0035; F21V 17/164; F21V 19/004; H01R 13/7175
(Continued)

(56) References Cited

U.S. PATENT DOCUMENTS 4,803,599 A * 2/1989 Trine ..................... F21K 99/00
                                                     362/249.06
5,453,855 A * 9/1995 Nakamura ........... G02B 6/0051
                                                     349/58
(Continued)

FOREIGN PATENT DOCUMENTS

CN    202266937 U     6/2012
CN    102588842 A *   7/2012
(Continued)

OTHER PUBLICATIONS

International Search Report and Written Opinion dated Oct. 27, 2014 regarding PCT/CN2014/083059. Translation provided by Dragon Intellectual Property Law Firm.
(Continued)

*Primary Examiner* — Karabi Guharay
*Assistant Examiner* — Matthew Peerce
(74) *Attorney, Agent, or Firm* — Harness, Dickey & Pierce, P.L.C.

(57) ABSTRACT

The present disclosure provides a backlight module and a display device. The backlight module includes a back plate, a light bar arranged on the back plate, and a clamping structure. The clamping structure includes clamping members arranged on the light bar, and positioning connectors
(Continued)

arranged on the back plate at positions corresponding to the clamping members. The clamping members cooperate with the positioning connectors to secure the light bar onto the back plate.

10 Claims, 3 Drawing Sheets

(58) Field of Classification Search
USPC .............................................. 362/606; 349/61
See application file for complete search history.

(56) References Cited

U.S. PATENT DOCUMENTS

| | | |
|---|---|---|
| 6,789,921 B1 | 9/2004 | Deloy et al. |
| 2007/0145383 A1* | 6/2007 | Rho .................... H01L 25/0753 |
| | | 257/79 |
| 2012/0075550 A1 | 3/2012 | Kuromizu |
| 2012/0242929 A1* | 9/2012 | Ohyama .............. G02B 6/0068 |
| | | 349/61 |
| 2012/0250288 A1* | 10/2012 | Que .................. G02F 1/133603 |
| | | 362/97.1 |
| 2012/0320625 A1* | 12/2012 | Ishimoto .............. G02B 6/0088 |
| | | 362/602 |
| 2013/0128190 A1* | 5/2013 | Huang .................... G09F 13/18 |
| | | 349/65 |

FOREIGN PATENT DOCUMENTS

| | | |
|---|---|---|
| CN | 202452298 U | 9/2012 |
| CN | 102878480 A | 1/2013 |
| CN | 103162247 A | 6/2013 |
| CN | 103712131 A | 4/2014 |
| JP | 2007086648 A | 4/2007 |
| JP | 5443024 b2 * | 3/2014 |

OTHER PUBLICATIONS

Chinese Office Action dated May 22, 2015 regarding Chinese Application No. 201310741292.X. Translation provided by Dragon Intellectual Property Law Firm.

* cited by examiner

BACKLIGHT MODULE AND DISPLAY DEVICE

CROSS-REFERENCE TO RELATED APPLICATION

This application is the U.S. national phase of PCT Application No. PCT/CN2014/083059 filed on Jul. 25, 2014, which claims a priority of the Chinese patent application No. 201310741292.X filed on Dec. 27, 2013, the disclosures of which are incorporated in their entireties by reference herein.

TECHNICAL FIELD

The present disclosure relates to the field of display technology, in particular to a backlight module and a display device.

BACKGROUND

FIG. 1 shows an internal structure of a traditional liquid crystal module. Before assembling a backlight module of the traditional liquid crystal module, it is required to secure a light bar 1 onto a back plate 3. The light bar 1 includes an aluminum substrate 11 and a light source 12 (as shown in FIG. 3). In order to secure the light bar 1 onto the back plate 3, it is required to paste a thermally conductive adhesive 2 onto the aluminum substrate 11 of the light bar 1 and then adhere the resultant light bar 1 onto the back plate 3 (FIG. 2 shows assembling of the light bar 1 with the back plate 3). Because the light bar 1 is secured onto the back plate 3 manually and it is impossible to ensure a fixed position of the light bar 1 on the back plate 3 during the adhesion, the light bar 1 may be secured at a wrong position or may not be secured on the back plate 3 firmly. In addition, for the backlight modules of some types, such a phenomenon as imperfect adhesion will easily occur due to limitations in the design.

SUMMARY

In order to solve the above technical problem, the present disclosure provides a backlight module and a display device, so as to secure a light bar precisely and conveniently, thereby to improve luminous efficiency.

In order to achieve the above object, one technical solution adopted in the present disclosure is a backlight module, including a back plate, a light bar arranged on the back plate and a clamping structure. The clamping structure includes clamping members arranged on the light bar, and positioning connectors arranged on the back plate at positions corresponding to the clamping members. The clamping members cooperate with the positioning connectors to secure the light bar onto the back plate.

Further, the clamping members are a plurality of plug boards arranged at a side of the light bar adjacent to the back plate, the positioning connectors are via-holes arranged in the back plate at positions corresponding to the plug boards, and the plug boards extend through the via-holes and are bent to be attached to the back plate.

Further, the light bar includes an aluminum substrate and a light source arranged at one side of the aluminum substrate, and the clamping members are arranged at the other side of the aluminum substrate.

Further, the clamping members are formed integrally with the aluminum substrate.

Further, the clamping members are connected to the aluminum substrate by an adhesive or by welding.

Further, the plug board is made of flexible material.

Further, the aluminum substrate is in direct contact with the back plate.

Further, the backlight module further includes a light-guide plate secured onto the back plate and an optical membrane arranged at a front of the light-guide plate. The back plate includes a first portion arranged on a back of the light-guide plate and a second portion surrounding side faces of the light-guide plate. The positioning connectors are arranged at the second portion.

Further, the light bar includes an aluminum substrate and a light source arranged at one side of the aluminum substrate, the clamping members are arranged at the other side of the aluminum substrate, and the other side of the aluminum substrate is in direct contact with the second portion of the back plate.

The present disclosure further provides a display device including a display panel, the above-mentioned backlight module, and a bezel for assembling the display panel and the backlight module.

Beneficial effects of the present disclosure include conveniently securing the light bar and positioning the light bar in a better manner.

DETAILED DESCRIPTION

Structures and principles of the present disclosure will be described hereinafter in conjunction with the drawings. The following embodiments are for illustrative purposes only, but shall not be used to limit the scope of the present disclosure.

Figure 1:
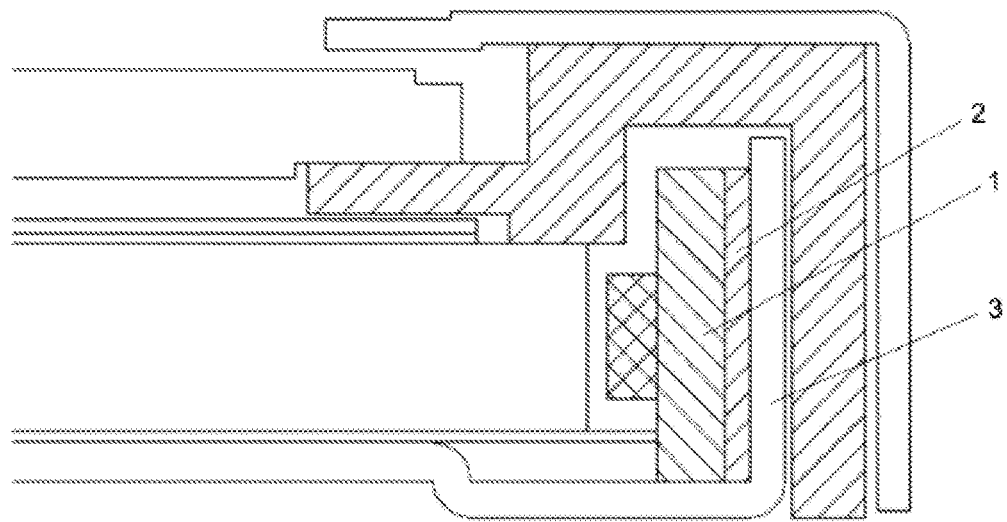
FIG. 1 is a schematic view showing a liquid crystal module in the related art.
Figure 2:
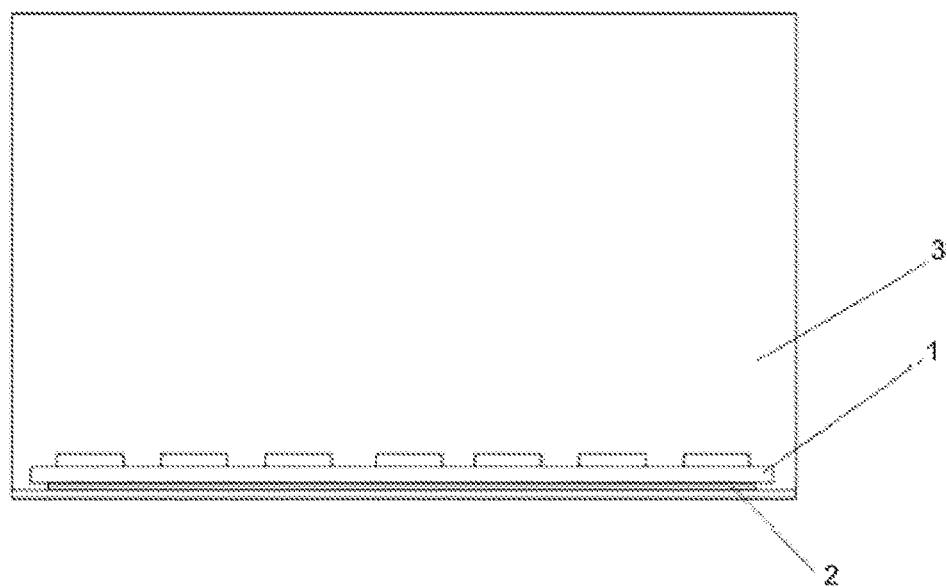
FIG. 2 is a schematic view showing assembling of a light bar and a back plate in the related art.
Figure 3:
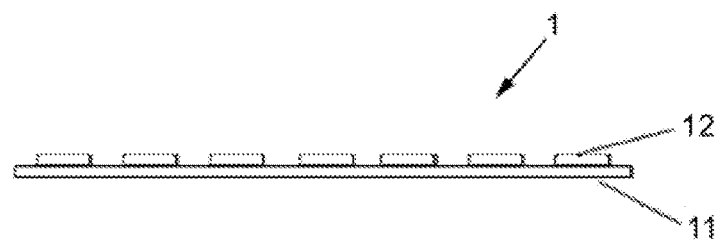
FIG. 3 is a schematic view showing the light bar in the related art.
Figure 4:
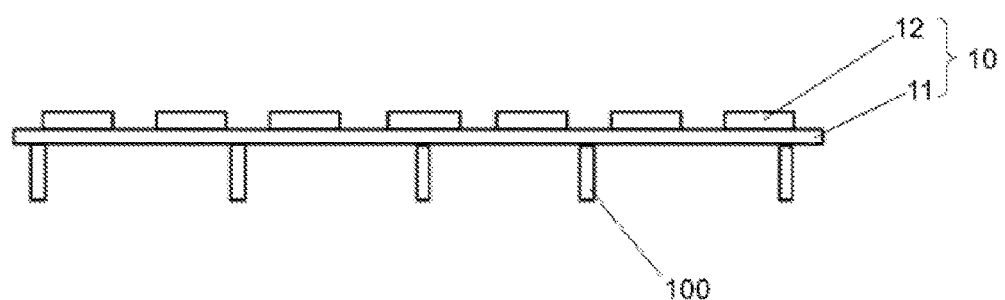
FIG. 4 is a schematic view showing clamping members on a light bar in a first state according to one embodiment of the present disclosure.
Figure 5:
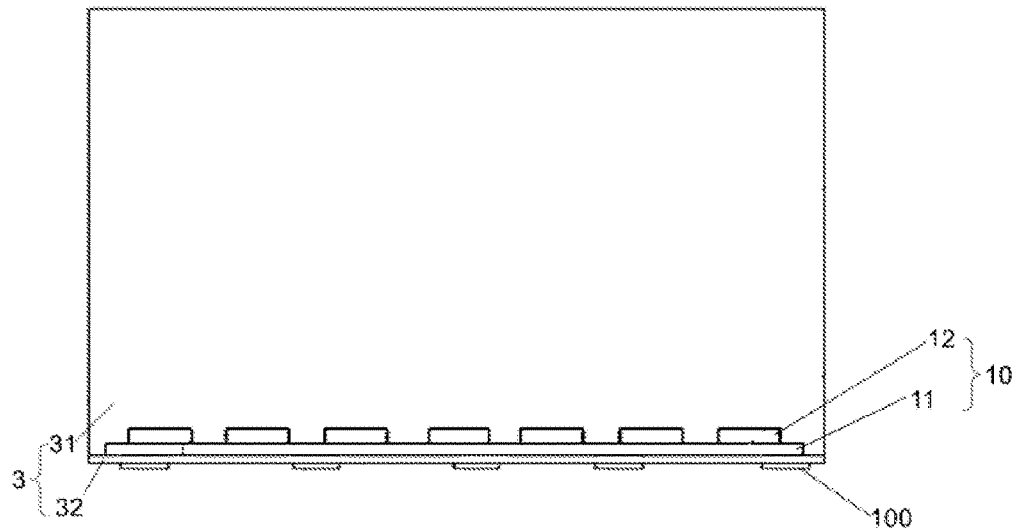
FIG. 5 is a schematic view showing assembling of the light bar and a back plate according to one embodiment of the present disclosure.
Figure 6:
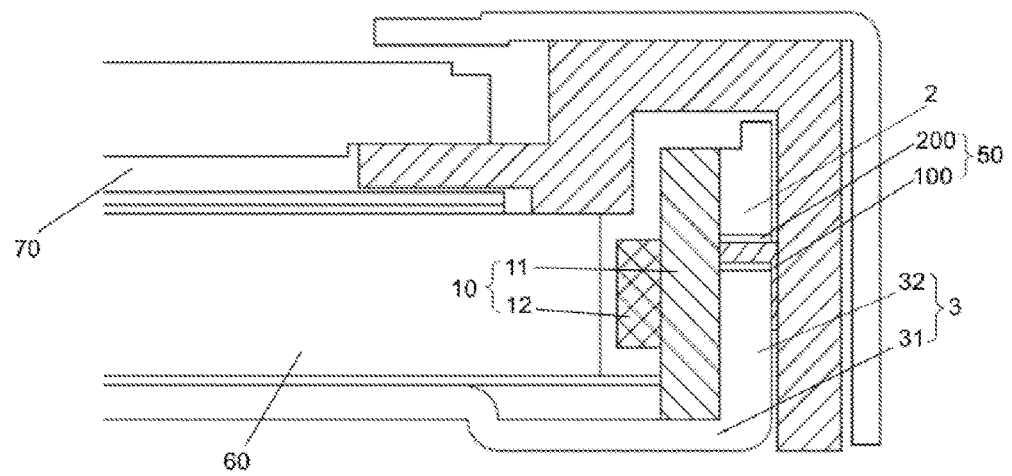
FIG. 6 is a schematic view showing a connection state of the light bar and the back plate according to one embodiment of the present disclosure.

As shown in FIGS. 4, 5 and 6, the present disclosure provides in one embodiment a backlight module, including a back plate 3, a light bar 10 arranged on the back plate 3, and a clamping structure 50 for securing the light bar 10 onto the back plate 3. The clamping structure 50 includes clamping members 100 arranged on the light bar 10, and positioning connectors 200 arranged on the back plate 3 at positions corresponding to the clamping members 100. The clamping members 100 cooperate with the positioning connectors 200 so as to secure the light bar 10 onto the back plate 3.

As compared with the related art where a light bar 1 is adhered onto the back plate 3 by a thermally conductive adhesive 2, using the clamping structure 50 to secure the light bar 10 onto the back plate 3 may conveniently secure the light bar 10 and position the light bar 10 in a better manner, thereby to prevent the occurrence of deviations due to manual operations in the traditional connection method where the light bar 1 is adhered by the thermally conductive adhesive 2.

The clamping structure 50 may be implemented in various forms but not limited to the mode mentioned above, as long as the light bar 10 may be secured onto the back plate 3 conveniently and rapidly and positioned in a better manner.

In this embodiment, the clamping members 100 are a plurality of plug boards arranged at a side of the light bar 10 adjacent to the back plate 3. As shown in FIG. 6, the positioning connectors 200 are via-holes arranged in the back plate 3 at positions corresponding to the clamping members 100 such as the plug boards. A cross section of the via-hole is slightly greater than a cross section of the clamping member 100 such as the plug board. The clamping members 100 such as the plug boards have a first state and a second state. In the first state, the clamping members 100 such as the plug boards are substantially perpendicular to the light bar 10, as shown in FIG. 4. In the second state, the clamping members 100 such as the plug boards extend through the positioning connectors 200 such as the via-holes and are bent reversely to be attached to the back plate 3 so as to secure the light bar 1 onto the back plate 3, as shown in FIG. 6.

Before the assembling the light bar 10 with the back plate 3, the clamping members 100 such as the plug boards are substantially perpendicular to the light bar 10. During the assembling, the clamping members 100 such as the plug boards extend through the positioning connectors 200 such as the via-hole, and then are bent reversely to be attached to the back plate 3, so as to secure the light bar 10 onto the back plate 3. After the clamping members 100 such as the plug boards are bent, the light bar 10 may be naturally secured due to limitations of a size of the positioning connectors 200 such as the via-holes, as well as the gravity of the light bar 10 itself. The clamping members 100 such as the plug boards may merely be attached to, rather than be secured to, a side of the back plate 3 away from the light bar 10, so as to facilitate the subsequent disassembling and reusing. In this embodiment, through the above connection mode, it is able to secure the light bar 10 in a simple manner and prevent the occurrence of deviations due to inaccurate positioning of the light bar in a traditional method where the light bar is manually adhered onto the back plate by the thermally conductive adhesive, thereby to improve the reliability of a resultant product.

In this embodiment, the clamping member 100 such as the plug board is made of flexible material.

Since the clamping member 100 such as the plug board is required to be bent to be attached to the back plate 3 so as to secure the light bar 10 onto the back plate 3, thus the clamping member 100 such as the plug board may be made of flexible material. In order to secure the light bar 10 in a better manner, the number of the clamping members 100 such as the plug boards and the corresponding position connectors 200 such as the via-holes in the back plate 3 may be set in accordance with practical needs.

As shown in FIG. 5, the light bar 10 includes an aluminum substrate 11 and a light source 12 arranged at one side of the aluminum substrate 11. The clamping members 100 are arranged at the other side of the aluminum substrate 11.

In this embodiment, the light source 12 is an LED lamp.

In this embodiment, through the above connection mode, it is able to secure the light bar 10 in a simple manner, and prevent the occurrence of deviations due to inaccurate positioning of the light bar in a traditional method where the light bar is manually adhered by the thermally conductive adhesive. In addition, since metal surfaces are in direct contact with each other (i.e., the aluminum substrate 11 of the light bar 10 is in direct contact with the back plate 3), thus heat dissipation effect may be theoretically improved.

The clamping members 100 may be connected to the aluminum substrate 11 in various modes. The clamping members 100 may be formed integrally with the aluminum substrate 11, or connected thereto by welding or adhesion. The clamping members 100 cooperate with the positioning connectors 200 so as to secure the light bar 10 onto the back plate 3, thereby to achieve the above effect. Several connection modes for connecting the clamping members 100 and the aluminum substrate 11 will be described hereinafter.

In one embodiment, the clamping members 100 may be formed integrally with the aluminum substrate 11.

In another embodiment, the clamping members 100 may be connected to the aluminum substrate 11 by an adhesive or by welding.

As shown in FIG. 6, the backlight module of this embodiment further includes a light-guide plate 60 secured onto the back plate 3, and an optical membrane 70 arranged at the front of the light-guide plate 60. The back plate 3 includes a first portion 31 arranged at the back of the light-guide plate 60 and a second portion 32 surrounding side faces of the light-guide plate 60. The positioning connectors 200 are arranged at the second portion 32.

For a traditional backlight module, it is required to paste a thermally conductive adhesive onto the aluminum substrate of the light bar, and then manually adhere the light bar onto the back light, and it is impossible to ensure a fixed position of the light bar on the back plate during the adhesion due to manual operations. According to the embodiments of the present disclosure, since the positions of the clamping members 100 such as the plug boards and the corresponding positioning connectors 200 such as the via-holes in the back plate 3 are set in advance, thus the position of the light bar 10 may be maintained within a predetermined range so as to provide a stable light-incident position, and then, when the light bar 10 cooperates with the light-guide plate 60, better luminous efficiency will be obtained as compared with a traditional method where the light bar is adhered by the thermally conductive adhesive.

Meanwhile, for the traditional method for securing the light bar, such a phenomenon as imperfect adhesion also occurs easily due to limitations in the design of backlight modules of some types, and there is a small contact area for the thermally conductive adhesive at a position of a hook (currently the back plate and a plastic frame are connected to a metallic bezel through the hook). As a result, the securing of the light bar at an end of a connector (a portion at which the light bar is connected to a power supply) will be adversely affected, and the connector will easily loose and fall off therefrom. Through the modes for securing the light bar mentioned in the above embodiments of the present disclosure, it is able to prevent the occurrence of such problems.

The present disclosure further provides in one embodiment a display device including a display panel, the above-mentioned backlight module, and a bezel for assembling the display panel and the backlight module.

The above are merely optional embodiments of the present disclosure. It should be appreciated that, a person skilled in the art may make further improvements and modifications without departing from the principle of the present disclosure, and these improvements and modifications shall also fall within the scope of the present disclosure.

What is claimed is:

1. A backlight module, comprising a back plate and a light bar arranged on the back plate; wherein the backlight module further comprises a clamping structure; the clamping structure comprises clamping members arranged on the light bar, and positioning connectors arranged on the back plate at positions corresponding to the clamping members; the clamping members are capable of cooperating with the positioning connectors to secure the light bar onto the back plate,
   wherein the clamping members are arranged at a side of the light bar adjacent to the back plate; the positioning connectors comprise via-holes arranged in the back plate at positions corresponding to the clamping members,
   the clamping members are capable of being switched between a first state and a second state:
   in the first state, the clamping members are substantially perpendicular to the light bar, and the light bar is not secured onto the back plate; and
   in the second state, each of the clamping members is bent flexibly and reversely to form a first portion and a second portion, wherein the first portion of the clamping member extends through a respective one of the via-holes in a first direction, the second portion of the clamping member extends in a second direction to be attached to the back plate to secure the light bar onto the back plate, the first portion and the second portion of the clamping member are connected to each other, and the first direction and the second direction are opposite to each other;
   wherein the light bar comprises an aluminum substrate and a light source arranged at one side of the aluminum substrate; the clamping members are arranged at an other side of the aluminum substrate that is opposite to the one side of the aluminum substrate, wherein the clamping members are formed integrally with the aluminum substrate.

2. The backlight module according to claim 1, wherein the clamping members are connected to the aluminum substrate by an adhesive or by welding.

3. The backlight module according to claim 1, wherein the aluminum substrate is in direct contact with the back plate.

4. The backlight module according to claim 1, further comprises a light-guide plate secured onto the back plate and an optical membrane arranged at a front of the light-guide plate, the back plate comprises a first portion arranged on a back of the light-guide plate and a second portion surrounding side faces of the light-guide plate, and the positioning connectors are arranged on the second portion.

5. The backlight module according to claim 4, wherein the light bar comprises an aluminum substrate and a light source arranged at one side of the aluminum substrate; the clamping members are arranged at an other side of the aluminum substrate that is opposite to the one side of the aluminum substrate; the other side of the aluminum substrate is in direct contact with the second portion of the back plate.

6. A display device, comprising a display panel, a backlight module, and a bezel for assembling the display panel and the backlight module;
   wherein the backlight module comprises a back plate and a light bar arranged on the back plate; the backlight module further comprises a clamping structure; the clamping structure comprises clamping members arranged on the light bar, and positioning connectors arranged on the back plate at positions corresponding to the clamping members; the clamping members are capable of cooperating with the positioning connectors to secure the light bar onto the back plate,
   wherein the clamping members are arranged at a side of the light bar adjacent to the back plate; the positioning connectors comprise via-holes arranged in the back plate at positions corresponding to the clamping members,
   the clamping members are capable of being switched between a first state and a second state:
   in the first state, the clamping members are substantially perpendicular to the light bar, and the light bar is not secured onto the back plate; and
   in the second state, each of the clamping members is bent flexibly and reversely to form a first portion and a second portion, wherein the first portion of the clamping member extends through a respective one of the via-holes in a first direction, the second portion of the clamping member extends in a second direction to be attached to the back plate to secure the light bar onto the back plate, the first portion and the second portion of the clamping member are connected to each other, and the first direction and the second direction are opposite to each other;
   Wherein the light bar comprises an aluminum substrate and a light source arranged at one side of the aluminum substrate; the clamping members are arranged at an other side of the aluminum substrate that is opposite to the one side of the aluminum substrate, wherein the clamping members are formed integrally with the aluminum substrate.

7. The display device according to claim 6, wherein the clamping members are connected to the aluminum substrate by an adhesive or by welding.

8. The display device according to claim 6, wherein the aluminum substrate is in direct contact with the back plate.

9. The display device according to claim 6, the backlight module further comprises a light-guide plate secured onto the back plate and an optical membrane arranged at a front of the light-guide plate, the back plate comprises a first portion arranged on a back of the light-guide plate and a second portion surrounding side faces of the light-guide plate, and the positioning connectors are arranged on the second portion.

10. The display device according to claim 9, wherein the light bar comprises an aluminum substrate and a light source arranged at one side of the aluminum substrate; the clamping members are arranged at an other side of the aluminum substrate that is opposite to the one side of the aluminum substrate; the other side of the aluminum substrate is in direct contact with the second portion of the back plate.

* * * * *